//united States Patent [19]

Fukada

[11] Patent Number: 4,893,175
[45] Date of Patent: Jan. 9, 1990

[54] VIDEO SIGNAL TRANSMISSION SYSTEM WITH REDUCED NUMBER OF SIGNAL LINES

[75] Inventor: Akio Fukada, Tokyo, Japan
[73] Assignee: Kabushiki Kaisha Toshiba, Kawasaki, Japan
[21] Appl. No.: 128,278
[22] Filed: Dec. 3, 1987

[30] Foreign Application Priority Data

Jan. 30, 1987 [JP] Japan .................. 62-18616

[51] Int. Cl.$^4$ ............................................ H04N 11/06
[52] U.S. Cl. .................................. 358/12; 358/15/19
[58] Field of Search ................. 358/12, 13, 30, 23, 358/141, 19, 17, 15, 183

[56] References Cited

U.S. PATENT DOCUMENTS

| 4,249,266 | 2/1981 | Nakamori | 358/901 X |
| 4,670,773 | 6/1987 | Silverberg | 358/12 |
| 4,677,464 | 6/1987 | Yamaji et al. | 358/12 X |
| 4,709,256 | 11/1987 | Lechner et al. | 358/19 X |
| 4,710,824 | 12/1987 | Alston | 358/12 X |

FOREIGN PATENT DOCUMENTS 5941339  6/1986  Japan .

OTHER PUBLICATIONS

Elektronik; 3rd part: Nachrichtenelektronik, Rundunk-und Fernsehelektronik; Europa-Fachbuchreihe fur Elektrotechnik und das Lehrsystem Elektronik; 5th edition, Wuppertal, Verlag Europa-Lehrmittel, 1980, pp. 161 to 169, ISBN 3-8085-3225-4.

Gerdsen, Peter: Digitale Uebertragungstechnik; Stuttgart, Teubner-Verlag, 1983, pp. 153 and 154, ISBN 3-519-00093-8.

Primary Examiner—James J. Groody
Assistant Examiner—Victor R. Kostak
Attorney, Agent, or Firm—Oblon, Spivak, McClelland, Maier & Neustadt

[57] ABSTRACT

A video signal transmission system for transmitting a plurality of color video signals and horizontal/vertical sync signals from a transmitter part to a receiver part through a plurality of signal transmission lines is disclosed. The transmitter part includes a modulating circuit for modulating the video signals by a modulation method based on a Manchester format and generating a plurality of modulated video signals including Non Return to Zero video data, a synchronizing circuit for performing Code Rule Violation processing of the horizontal/vertical sync signals to generate burst signal-like sync signals in synchronism with the modulated video signals, a mixing circuit for mixing the burst signal-like sync signals with some of the modulated video signals to generate a plurality of transmission signals numbering less than a sum of the numbers of the modulated video signals and the horizontal/vertical sync signals, and a transmission circuit for transmitting the transmission signals to the signal transmission lines.

62 Claims, 13 Drawing Sheets

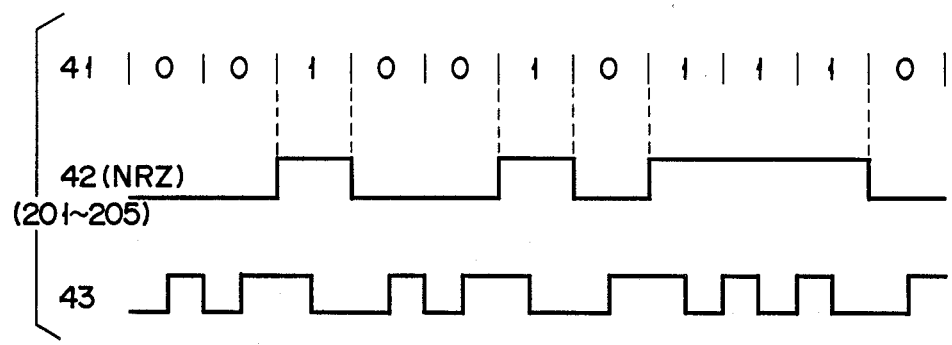
F I G. 6
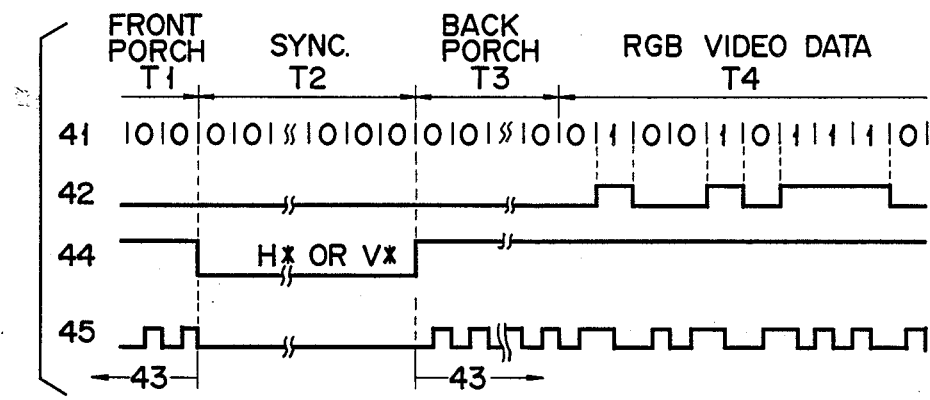
F I G. 7
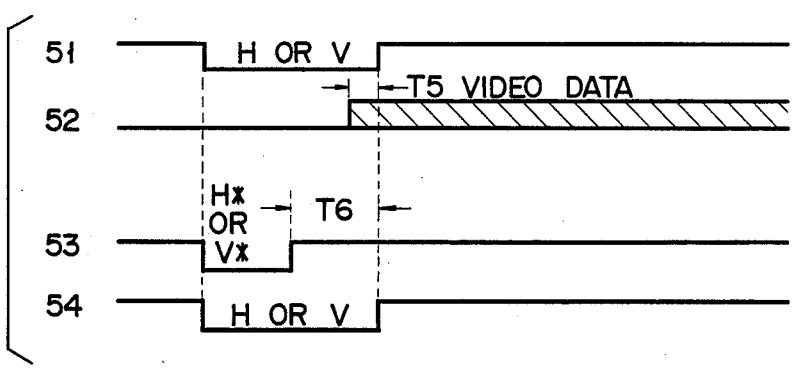
F I G. 8

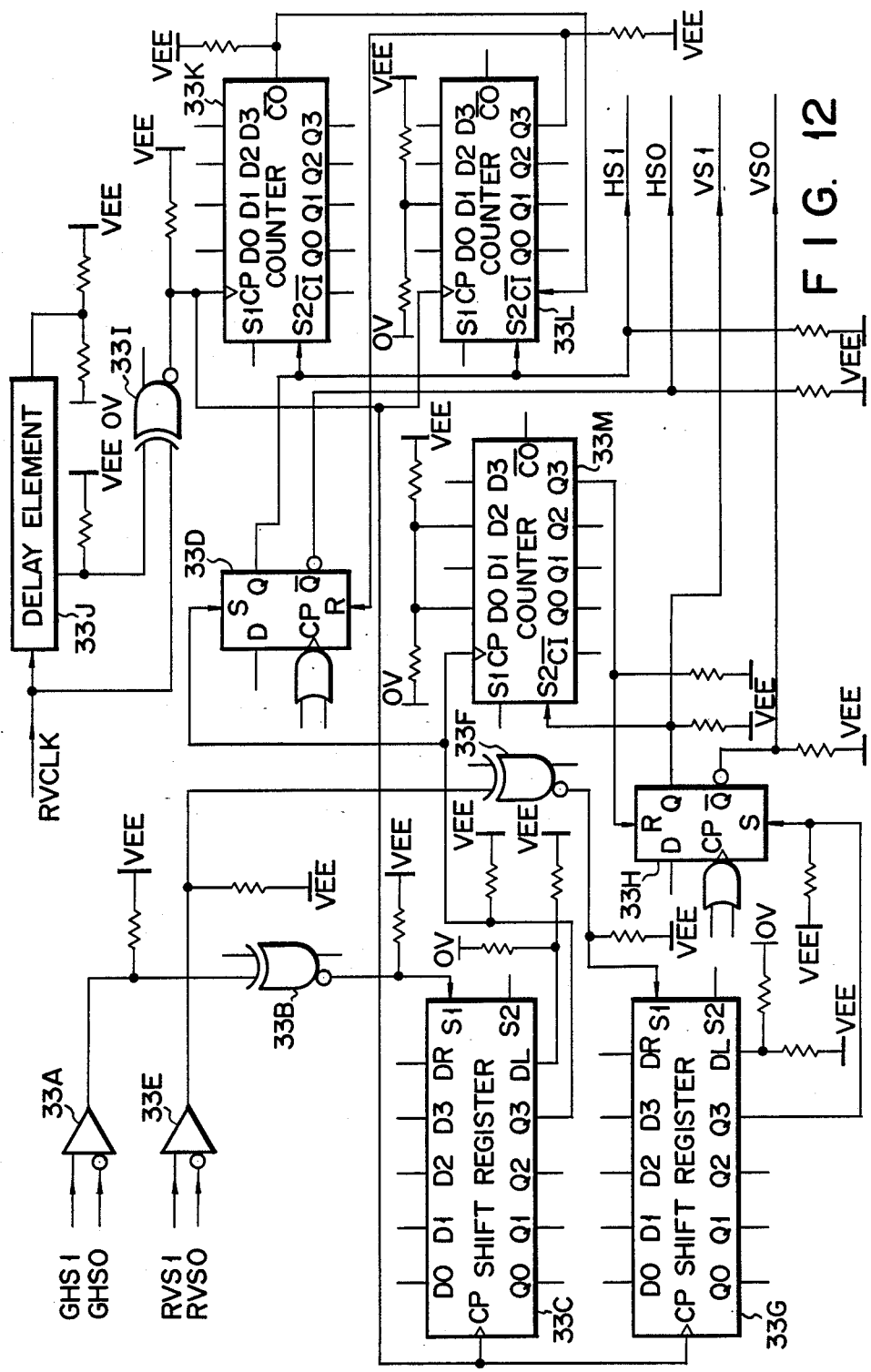
F I G. 12

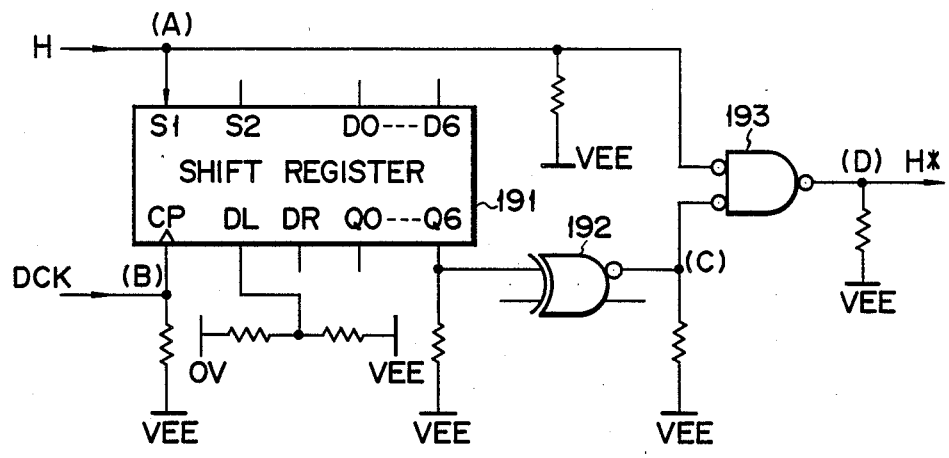
F I G. 19
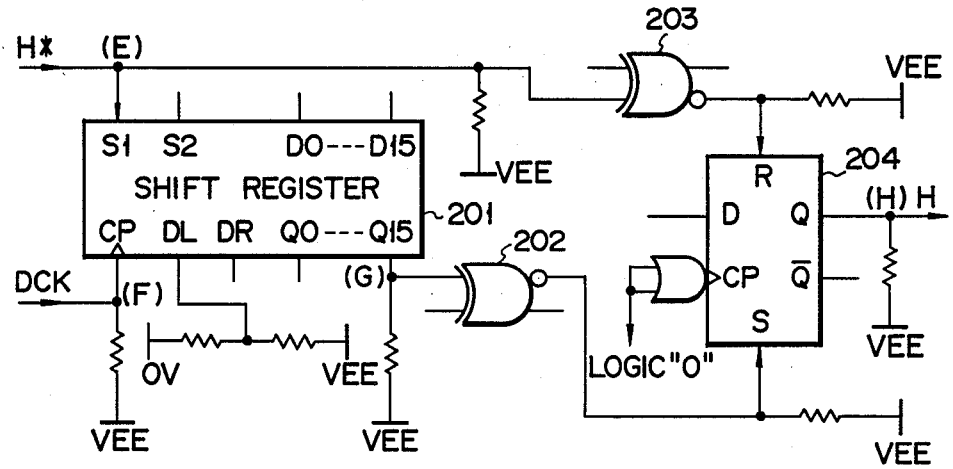
F I G. 20

VIDEO SIGNAL TRANSMISSION SYSTEM WITH REDUCED NUMBER OF SIGNAL LINES

BACKGROUND OF THE INVENTION

The present invention relates to an improvement in a video signal transmission system used when a video signal is transmitted through a signal line and a corresponding image is displayed.

An information processing apparatus is normally used in three ways of usage. In the first usage, an input device and a CRT display are integrally attached to an apparatus body, and a signal is appropriately processed by the apparatus body based on information from the input device to be displayed on the CRT display. In the second usage, information transmitted from a remote place is appropriately processed by the apparatus body to be displayed on the CRT display. In the third usage, information from an input device located relatively close the apparatus body is appropriately processed by the apparatus body to be displayed on the CRT display.

The system of the present invention is mainly applied to the latter two usages in view of information transmission using the signal lines. In this case, a video signal (e.g., red, green, and blue color signals) consisting of a plurality of bits and a 2-bit sync signal (horizontal sync signal and vertical sync signal) must be transmitted using external signal lines, and a video signal must be displayed on the CRT display of the apparatus body based on these signals.

In general, timings of various signals and a CRT screen have the relationship shown in FIG. 1. More specifically, on a CRT screen, a central portion serves as display area 1, and horizontal back porch 2 and horizontal front porch 3 are assigned to the two side portions of display area 1. In addition, vertical back porch 4 and vertical front porch 5 are assigned to portions above and below display area 1. H. sync signal 6, V. sync signal 7, and video signals 8 and 9 are supplied at timings shown in FIG. 1.

The sync signals and the video signals have the timing relationship shown in FIG. 2. More specifically, H. sync signal 6a for each horizontal scanning line is sequentially generated in response to the leading edge of V. sync signal 7a at equal intervals. In FIG. 2, V. sync signal 7b and H. sync signal 6b are enlarged V. sync and H. sync signals 7a and 6a. H. sync signal 6b is supplied to the CRT display during a predetermined H. sync period from the leading edge of V. sync signal 7b. H. back porch 2, display period 11b of video signal 11a, and H. front porch 3 are set between two adjacent H. sync signals (6b—6b) having H. sync periods (6c).

The CRT display normally reproduces and displays an image once per 20 to 25 msec at a frequency of 40 to 50 Hz. When an image is reproduced at a V. sync frequency lower than 40 Hz, flickering occurs on the screen. The screen is constituted by 640 dots in the horizontal direction, and 500 dots in the vertical direction in the case of a personal computer. The screen may be constituted by 1024 dots in both the horizontal and vertical directions to have a high resolution, if necessary. In this case, a display period per dot corresponds to about 40 to 45 nsec.

When various signals (6 to 9) are transmitted to the CRT display with the above screen configuration using a cable, the contents of original signals may be lost due to attenuation of the signals and a decrease in a slew rate of the signals unless an inter-line capacitance, a line resistance, and the like of the cable is reduced as low as possible.

In an information processing apparatus employing the above video signal transmission system, the interline capacitance and the line resistance of the cable are increased along with the higher resolution image configuration, as a distance between transmitter and receiver systems of the video signal is increased. Thus, a transmitted image cannot be normally displayed on the CRT display due to waveform distortion of and/or attenuation of the transmission signal.

It may also be proposed to use an optical fiber in place of a normal cable without extending the cable, and modulate/demodulate signals by a Manchester code. With this system, a cable length can be increased to several km. However, the number of cores of the cable, corresponding to that of video signals and sync signals, is required, resulting in an expensive system. Therefore, it is a material problem to reduce the number of cores of the cable. Even if no optical fiber is used or even if the cable is not extended to several km, a reduction in number of cores of the cable is still very effective to improve product value (or to reduce a manufacturing cost).

SUMMARY OF THE INVENTION

It is accordingly an object of the present invention to provide a signal transmission system which can reduce the number of signal lines of a signal transmission medium (e.g., an optical fiber cable), used for transmitting a signal including a plurality of pieces of information (e.g., video and sync signals), to be smaller than that of the information.

It is another object of the present invention to provide a signal transmission system which can reliably perform long-distance transmission of color video signals and sync signals, and can reduce the number of signal lines, used in the transmission, to be smaller than a total number of the color video signals and sync signals.

To achieve the above object, in the signal transmission system of the present invention, original data to be transmitted is modulated using a modulation method (e.g., the Manchester format) which allows separation by a receiver part, and sub signals (e.g., horizontal/vertical sync signal) to be transmitted together with the original data are mixed with the modulated original data in the form of a burst signal (e.g., a signal subjected to Code Rule Violation (CRV) processing) not complying with the rule of modulation.

With the above modulation method, the mixed signal of the burst signal and the modulated original data can be transmitted to the receiver part through signal lines, the number of which is smaller than a sum of the number of original data and the number of sub signals. In addition, since the burst signal and the modulated original data are transmitted by the modulation method which allows separation by the receiver part, the original data (color video signals) and sub signals (horizontal/vertical sync signals) separated from the original data can be sent to a CRT display of the receiver part, even though a transmitter part having a small number of signal lines is used.

The above modulation method allows bit inversion "0"→"1" or "1"→"0" to always occur at the center of a bit string of the modulated original data (modulated video signal). For this reason, signal charges of transmission data can be prevented from being kept accumulated on a line capacitance of the signal lines used for transmitting the modulated original data. Therefore long-distance signal transmission can be performed without being influenced by the line capacitance of the signal lines

BRIEF DESCRIPTION OF THE DRAWINGS

FIGS. 6, 6A, and 7 are timing charts for explaining signal processing executed by the transmitter part (20) shown in FIG. 3;

FIG. 8 is a timing chart for explaining signal processing which, when sync signals partially overlap a video signal, is performed for the sync signals to avoid such overlapping;

FIG. 12 is a circuit diagram of a separator and reproducer (33) shown in FIG. 5;

FIG. 19 is a circuit diagram showing an example of a sync signal modifying circuit for generating, in the transmitter part (20), a modified sync signal (53) from the sync signal (51) shown in FIG. 8;

FIG. 20 is a circuit diagram showing an example of a sync signal reproducing circuit for reproducing, in the receiver part (30), a sync signal (54) having a normal pulse width from the modified sync signal (53) shown in FIG. 8.

DETAILED DESCRIPTION OF THE PREFERRED EMBODIMENTS

Figure 1:
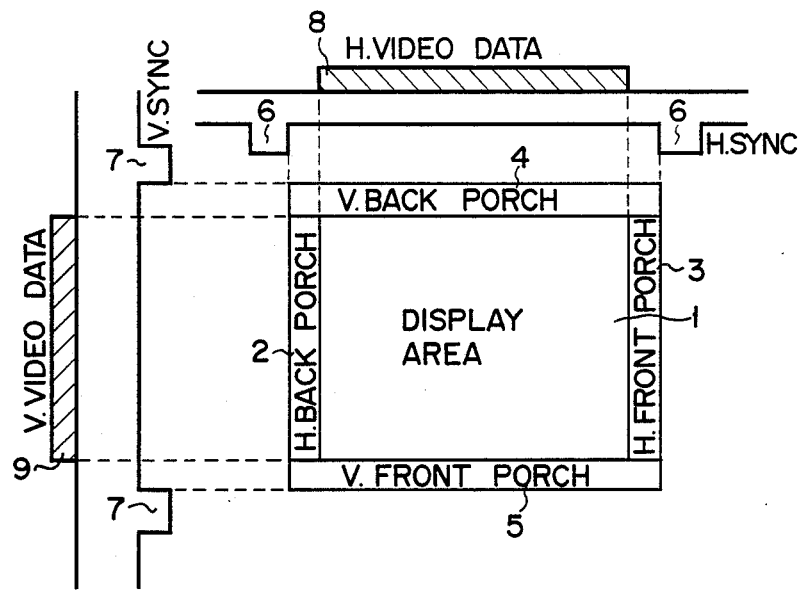
FIG. 1 is a timing chart showing a timing relationship between a CRT display screen, video signals, and sync signals.
Figure 2:
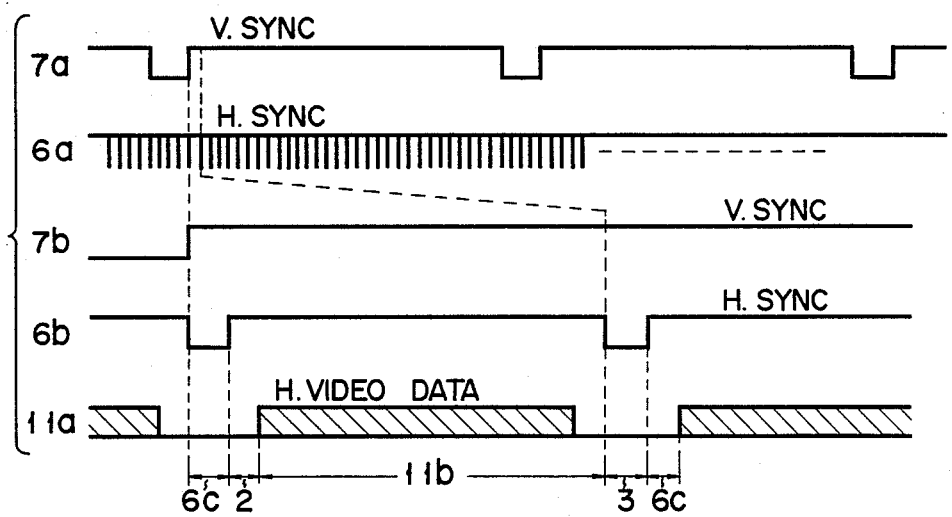
FIG. 2 is a timing chart showing a timing relationship between the video signals and sync signals.
Figure 3:
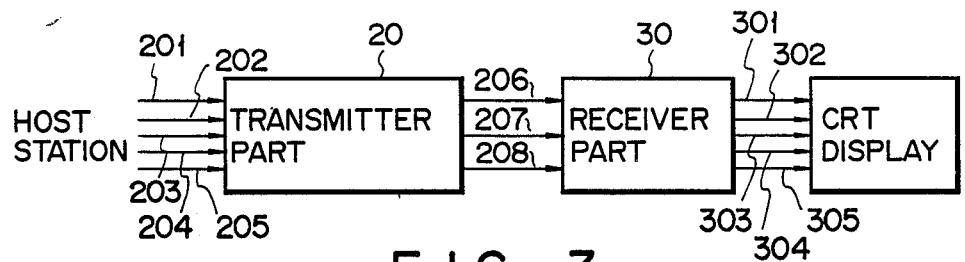
FIG. 3 is a block diagram showing a basic arrangement of a video signal transmission system according to the present invention.

An embodiment of the present invention will be described with reference to the accompanying drawings. FIG. 3 illustrates an apparatus to which the system of the present invention is applied. In a transmission system shown in FIG. 3, blue, green, and red NRZ (Non Return to Zero) video signals 201, 202, and 203 are supplied from a host station (not shown) to transmitter part 20 together with H. sync and V. sync signals 204 and 205 through five signal lines (e.g., cables or optical fibers).

Transmitter part 20 modulates the B, G, and R video signals by Manchester encoding to output, for example, video signal 208 in which a modulated red video signal (Manchester encoded signal R*) is mixed with a V. sync signal (V*), video signal 207 in which a modulated green video signal (G*) is mixed with an H. sync signal (H*), and modulated blue video signal (B*) 206. These signals are transmitted to receiver part (30) through cables (or optical fibers).

Note that for the literature associated with Manchester encoding/decoding and NRZ, "Microcommunications Handbook", INTEL Corp., U.S.A., p. 7-14 to p. 7-15, 1986 Edition is cited herein.

Receiver part 30 in the receiver system demodulates modulated video signals 206, 207, and 208 to output NRZ color video signals 301, 302, and 303, and separates and reproduces H. sync and V. sync signals 304 and 305 from modulated video signals 207 and 208. The contents of video signals 301 to 303 of these signals 301 to 305 are displayed on a CRT display.

Figure 4:
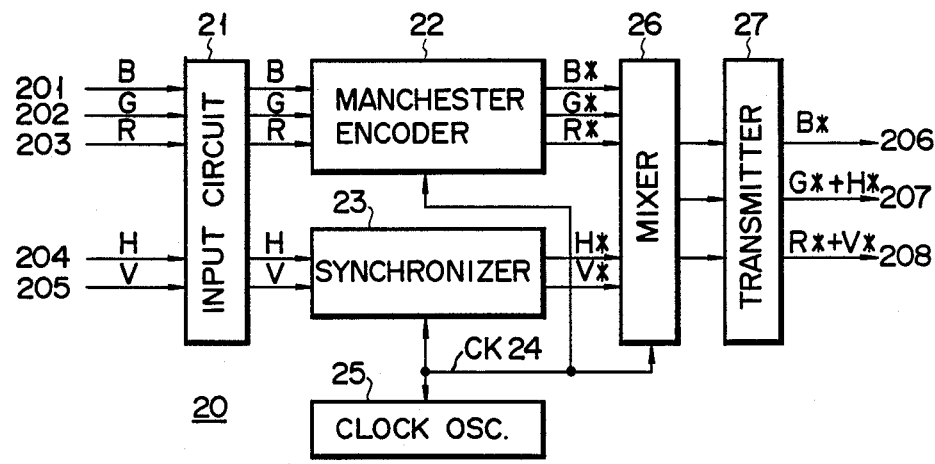
FIG. 4 is a block diagram showing an internal arrangement of a transmitter part (20) shown in FIG. 3.

More specifically, as shown in FIG. 4, transmitter part 20 comprises input circuit 21 for receiving NRZ video signals 201 to 203 and sync signals 204 and 205 generated by the host station; Manchester encoder 22 for Manchester encoding video signals (B, G, and R) output from input circuit 21; synchronizer 23 for synchronizing video signals (B*, G*, and R*) output from encoder 22 with sync signals (H and V); clock oscillator 25 for generating clock CK 24 used for Manchester encoder 22 and the like; mixer 26 for mixing the sync signals (H* and V*) from synchronizer 23 with video signals (B*, G*, and R*); and transmitter 27 for transmitting the signals (B*, G*+H*, and R*+V*) output from mixer 26 to the receiver part (30). Note that when the output from the transmitter part (20) is transmitted to the receiver part (30) in the form of an optical signal, transmitter 27 includes an electric-optical conversion function section.

Figure 5:
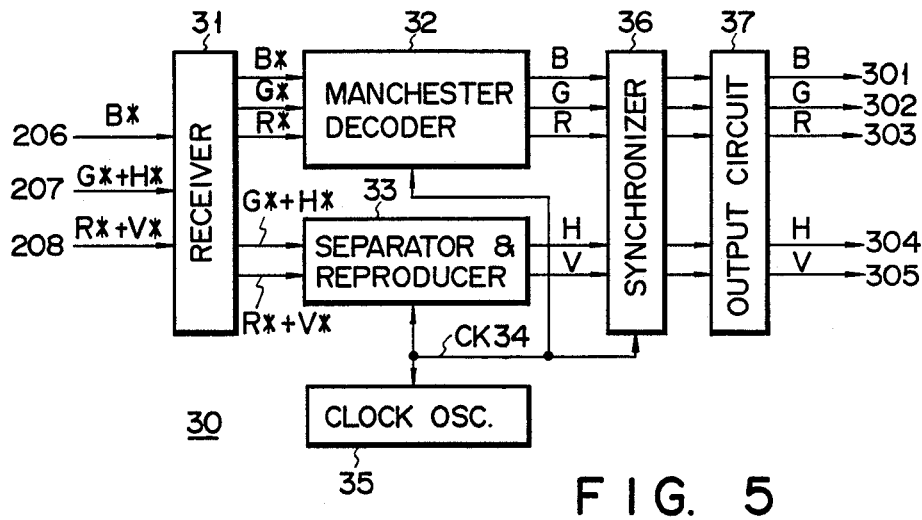
FIG. 5 is a block diagram showing an internal arrangement of a receiver part (30) shown in FIG. 3.

More specifically, receiver part 30 is arranged as shown in FIG. 5. That is, receiver part 30 receives video signals 207 and 208 transmitted from the transmitter part (20) and obtained by mixing the modulated video signals (G* and R*) modulated by the Manchester encoding with the sync signals (H* and V*), and modulated video signal 206 which is not mixed with the sync signal. When signals 206 to 208 are transmitted in the form of optical signals, receiver 31 for performing opto-electrical conversion is also used. Video signals (B*, G*, and R*) which are modulated by Manchester encoding are decoded by Manchester decoder 32, and separation and reproduction of the sync signals from video signals 207 and 208 are performed by separator & reproducer 33. Clock CK 34 for separating the sync signals (H and V) from received video signals 207 and 208 and for matching the timing between demodulated video signals (B, G, and R) with the sync signals (H and V) is obtained from clock oscillator 35. Synchronizer 36 is used for synchronizing the video signals and the sync signals, and the reproduced video signals (B, G, and R), and the sync signals (H and V) are supplied to the CRT display through output circuit 37.

The operation of the transmitter and receiver parts with the above arrangement in the video signal transmission system will now be described. H. sync and V. sync signals 204 and 205 are output from the host station at timings so as not to overlap video signals 201 to 203, and NRZ signal 42, modulated as shown in FIG. 6, is then output. Note that the NRZ signal is set at LOW level when data in data string 41 corresponds to data "0", and is set at HIGH level when it corresponds to data "1".

NRZ video signals 201 to 203 and sync signals 204 and 205, output from the host station as described above, are received by input circuit 21 of transmitter part 30. Thereafter, the video signals (B, R, and G) are sent to Manchester encoder 22, and the sync signals (H and V) are sent to synchronizer 23.

Manchester encoder 22 converts the NRZ video signals into Manchester-encoded signals 43 shown in FIG. 6, and sends the converted signals to mixer 26. At this time, synchronizer 23 supplies the sync signals to mixer 26 in synchronism with Manchester-encoded signals 43 using clock CK 24 from clock oscillator 25. In mixer 26, H. sync and V. sync signals subjected to CRV processing are mixed as burst signals on, e.g., green and red Manchester-encoded video signals, and the blue Manchester-encoded video signal is output without modification. The three output signals from mixer 26 are transmitted to the receiver part (30) through transmitter 27 via cables or optical fibers. In the Manchester-encoded signal, the signal level of a central bit is inverted, and the signal is used in a transmission system having a characteristic that allows only AC components of a capacitive coupling, a transformer coupling, and the like to pass therethrough.

Figure 6A:
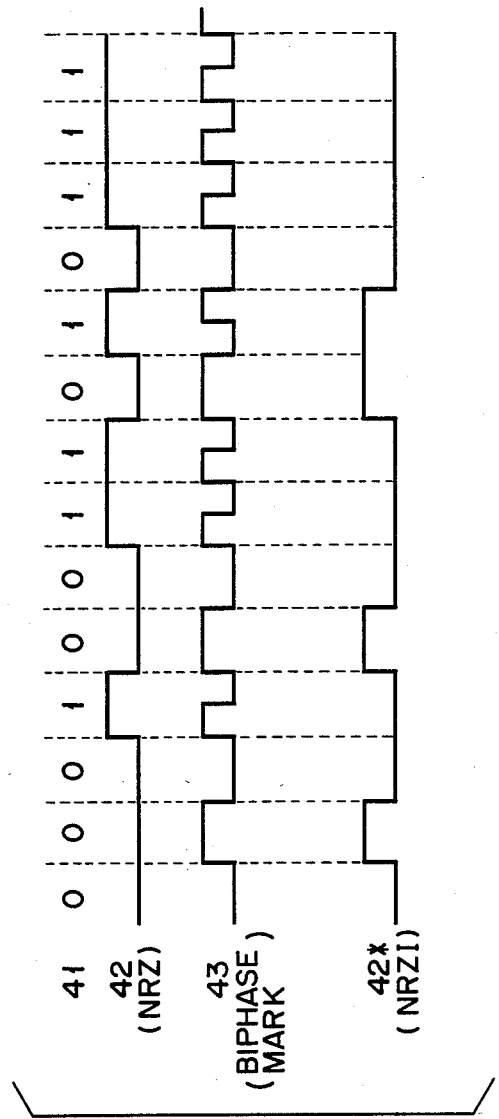

When the transmission system (206 to 208) employs a pulse transformer or optical transmission module, a biphase mark Manchester-encoded signal as indicated by 43 in FIG. 6A is used.

More specifically, in the system of the present invention, the host station generates data string 41 having significant data respectively in H. or V. front porch T1, H. or V. sync period T2, H. or V. back porch T3, and display period T4 (in period T4, a video signal), as shown in FIG. 7. The data string converted to NRZ video and sync signals 42 and 44 is output. Transmitter part 20 then generates two signals 45 obtained by mixing H. and V. sync signals 44 as the burst signals on Manchester-encoded video signals 43, and one Manchester-encoded video signal 43 not mixed with the sync signal.

The receiver part (30) receives signals 206 to 208 sent from the transmitter part (20) at receiver 31. Thereafter, Manchester-encoded signals 206 to 208 are converted to NRZ video signals 301 to 303 by Manchester decoder 32. Separator and reproducer 33 separates and reproduces sync signals 304 and 305 from the burst signals of the Manchester-encoded signals. These signals 301 to 305 are synchronized by synchronizer 36, and are then output to the CRT display through output circuit 37.

Figure 9:
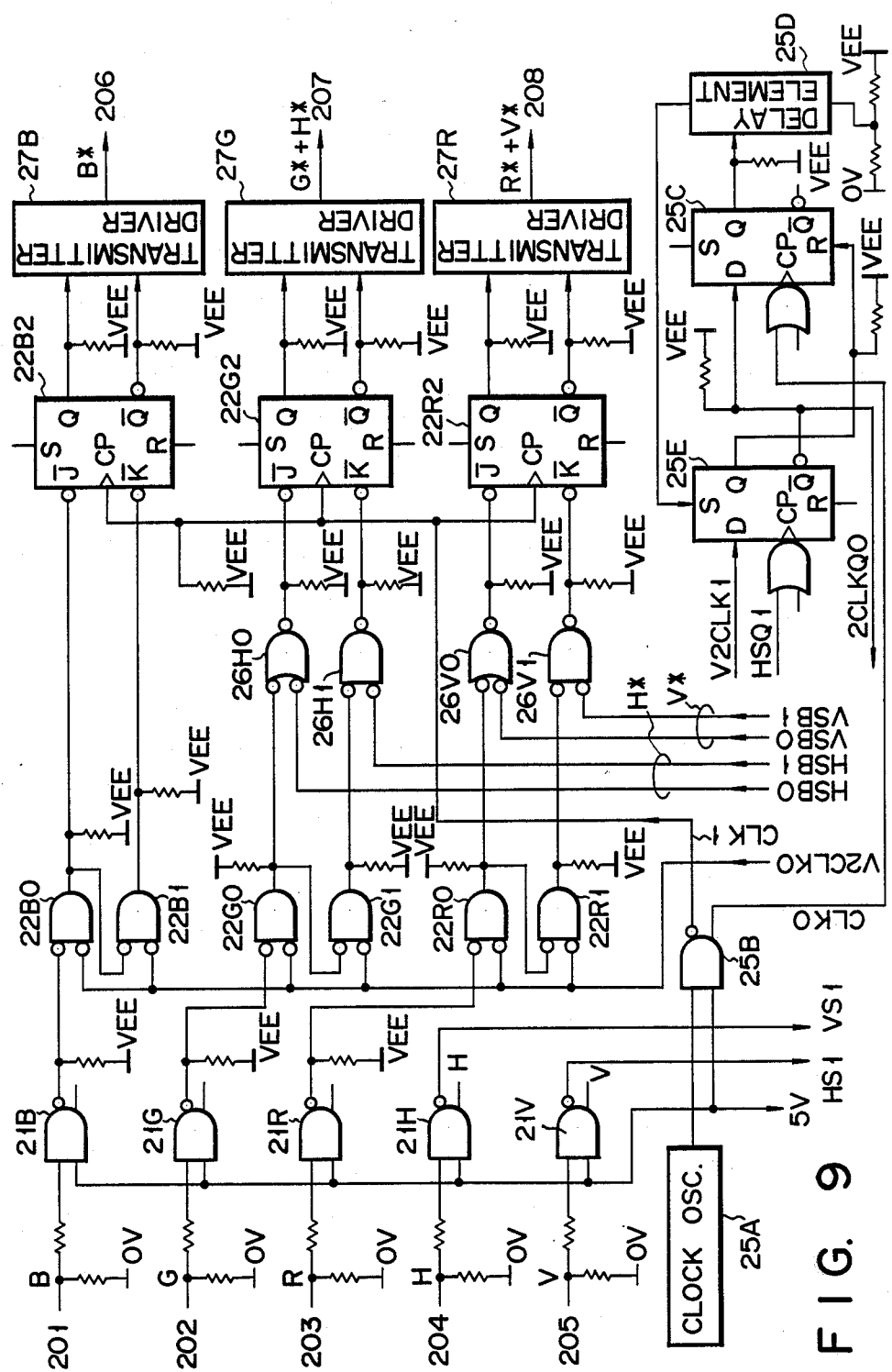
FIG. 9 is a circuit diagram showing an input circuit (21), a Manchester encoder (22), a clock oscillator (25), a mixer (26), and a transmitter (27) shown in FIG. 4.

FIG. 9 is a detailed circuit diagram of the input circuit (21), the Manchester encoder (22), the clock oscillator (25), the mixer (26), and the transmitter (27) shown in FIG. 4. (In each gate shown in FIG. 9, an input-open state indicates logic level "0", and when an input level is closer to a VEE level, this level is given as logic level "1". A resistor connected to a VEE circuit is a pull-down resistor for impedance matching.)

B, G, R, H, and V signals 201 to 205 at TTL level are respectively input to NAND gates 21B, 21G, 21R, 21H, and 21V. These NAND gates serve as translators for converting TTL level (0 to +5 V) of the input signals into ECL level (0 to −5.2 V=VEE), and correspond to input circuit 21 shown in FIG. 4.

The outputs from NAND gates 21B, 21G, and 21R converted to the ECL level are respectively supplied to first inputs of NOR gates 22B0, 22G0, and 22R0, respectively. The outputs from NAND gates 21H and 21V converted to the ECL level respectively serve as internal H. sync signal HS1 and internal V. sync signal VS1.

The outputs from NOR gates 22B0, 22G0, and 22R0 are supplied to the first inputs of NOR gates 22B1, 22G1, and 22R1. The second inputs of NOR gates 22B0, 22G0, and 22R0 and those of NOR gates 22B1, 22G1 and 22R1 respectively receive pulse V2CLK0 obtained from inverted output $\bar{Q}$ from J-K flip-flop 23S shown in FIG. 10.

The outputs from NOR gates 22B0 and 22B1 are respectively supplied to $\bar{J}$ and $\bar{K}$ input terminals of J-K flip-flop 22B2 (small circles at input terminals in FIG. 9 represent "active low" in negative logic).

The outputs from NOR gates 22G0 and 22G1 are respectively supplied to $\bar{J}$ and $\bar{K}$ input terminals of J-K flip-flop 22G2 through the first input terminals of AND gate 22H0 and OR gate 26H1. The second input terminal of AND gate 26H0 receives H. sync pulse HSB0, and the second input terminal of OR gate 26H1 receives H. sync pulse HSB1. Pulses HSB0 and HSB1 correspond to H. sync signal H* output from synchronizer 23 shown in FIG. 4, and are obtained from EX-NOR gate 23J shown in FIG. 10.

The outputs from NOR gates 22R0 and 22R1 are respectively supplied to $\bar{J}$ and $\bar{K}0$ input terminals of J-K flip-flop 22R2 through the first input terminals of AND gate 26V0 and OR gate 26V1. The second input terminal of AND gate 26V0 receives V. sync pulse VSB0, and the second input terminal of OR gate 26V1 receives V. sync pulse VSB1. Pulses VSB0 and VSB1 correspond to V. sync signal V* output from synchronizer 23 shown in FIG. 4, and are obtained from EX-NOR gate 23R shown in FIG. 10.

J-K flip-flops 22B2, 22G2, and 22R2 are clocked by the leading edge of clock pulse CLK1 obtained from clock oscillator 25A through NAND gate 25B.

Noninverted and inverted outputs Q and $\bar{Q}$ from flip-flop 22B2 correspond to Manchester-encoded blue video signal B*. These flip-flop outputs Q and $\bar{Q}$ are sent to the receiver part (30) as modulated video signal 206 through transmitter driver 27B.

Noninverted and inverted outputs Q and $\bar{Q}$ of flip-flop 22G2 correspond to a sum of Manchester-encoded green video signal G* and H. sync H*. These flip-flop outputs Q and $\bar{Q}$ are sent to the receiver part (30) as modulated video signal 207 through transmitter driver 27G.

Noninverted and inverted outputs Q and $\bar{Q}$ of flip-flop 22R2 correspond to a sum of Manchester-encoded red video signal R* and V. sync signal V*. These flip-flop outputs Q and $\bar{Q}$ are sent to the receiver part (30) as modulated video signal 208 through transmitter driver 27R.

The logical operations of J-K flip-flops 22B2, 22G2, and 22R2 at the leading edge of clock pulse CLK1 are as follows. If J="1" and K="1", the logical values of Q and $\overline{Q}$ are the same as those before being clocked by pulse CLK1. If J="0" and K="1", $\overline{Q}$="0". If J="1" and K="0", Q="0" and $\overline{Q}$="1". If J="0" and K="0", the logical values of Q and $\overline{Q}$ are inverted from the values before being clocked by pulse CLK1.

NAND gate 25B also outputs clock pulse CLK0 having the opposite phase to that of pulse CLK1. D-flip-flop 25C is clocked in response to the leading edge of pulse CLK0. Pulse CLKQ0 input to the D terminal of flip-flop 25C is obtained from inverted output $\overline{Q}$ of D-flip-flop 25E. Flip-flop 25C is reset by noninverted output Q of flip-flop 25E.

The leading edge of noninverted output Q from flip-flop 25C is delayed by a predetermined period of time through delay element 25D, and flip-flop 25E is set in response to the leading edge of the delayed signal. The D input terminal of flip-flop 25E receives pulse V2CLK1 obtained from noninverted output Q of D-flip-flop 23S shown in FIG. 10. Flip-flop 25E is clocked by the leading edge of pulse HSQ1 obtained from noninverted output Q of D-flip-flop 23A shown in FIG. 10.

Figure 10:
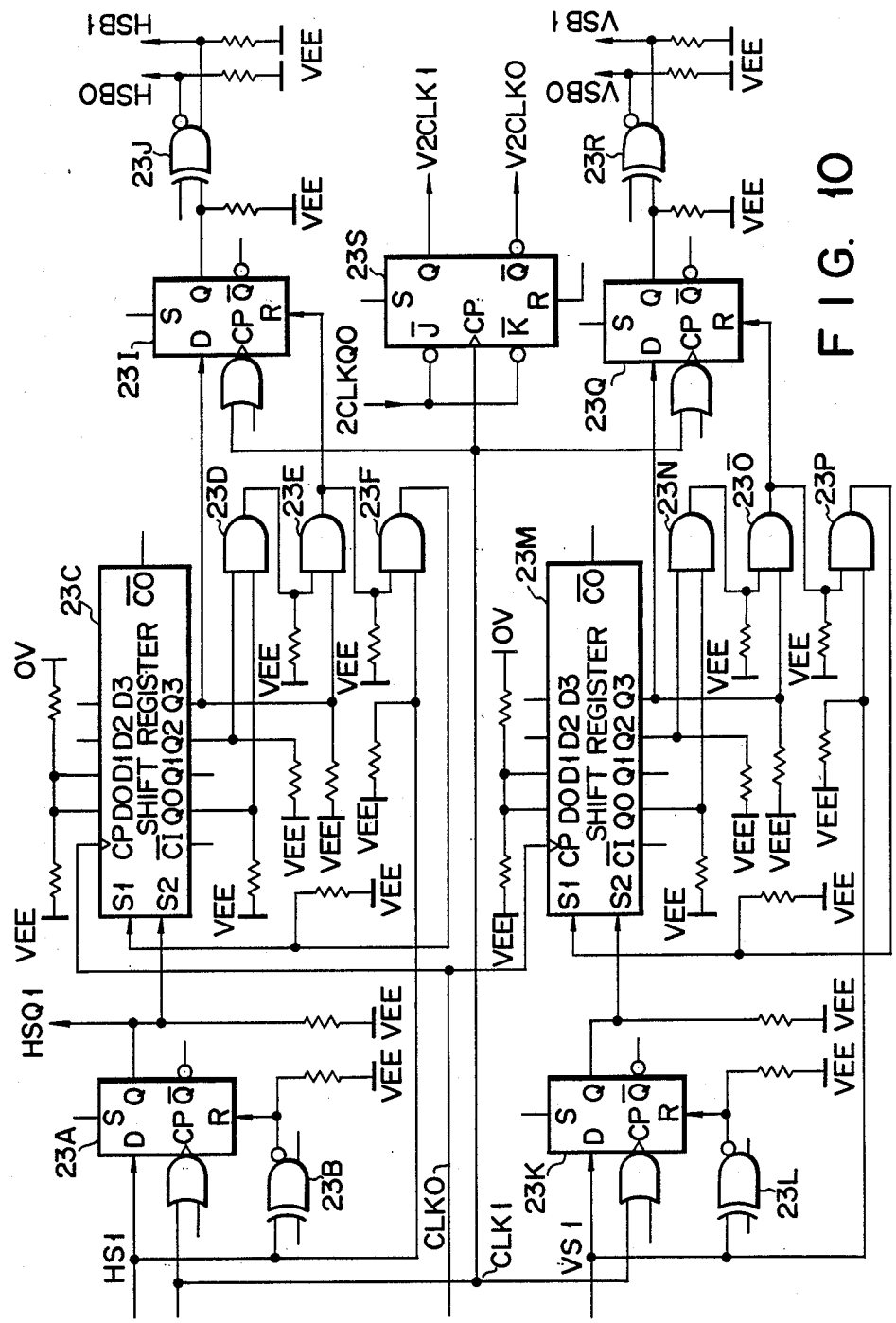
FIG. 10 is a circuit diagram of a synchronizer (23) shown in FIG. 4.

FIG. 10 is a circuit diagram of synchronizer 23 shown in FIG. 4. Internal H. sync signal HS1 from NAND gate 21V shown in FIG. 9 is supplied to the D input terminal of flip-flop 23A and EX-NOR gate 23B. D-flip-flop 23A is reset by the output from EX-NOR gate 23B, and is clocked by the leading edge of pulse CLK1 from NAND gate 25B shown in FIG. 9.

Pulse CLK1 is also supplied to J-K flip-flop 23S, and the clock terminals of flip-flops 23I, 23K, and 23Q. The J and $\overline{K}$ input terminals of flip-flop 23S receive pulse 2CLKQ0 from D-flip-flop 25E shown in FIG. 9.

Pulse HSQ1 from D-flip-flop 23A is supplied to second selection input terminal S2 of shift register 3C. Shift register 23C and shift register 23M (to be described later) are clocked by the leading edge of clock CLK0 from NAND gate 25B shown in FIG. 9.

Shift registers 23C and 23M perform the following operation in accordance with the logical values at first and second input terminals S1 and S2. More specifically, if S1="0" and S2="0", each register parallel-shifts data inputs D0 and D1 at logic level "1". If S1="0" and S2="1", each register right-shifts data inputs D0 and D1. If S1="1" and S2="0", each register left-shifts data inputs D0 and D1. If S1="1" and S2="1", each register stops shifting of data inputs D0 and D1.

Outputs Q0 and Q2 from shift register 23C are respectively supplied to the first and second input terminals of AND gate 23D. The output from AND gate 23D and output Q3 from shift register 23C are respectively supplied to the first and second input terminals of AND gate 23E. The output from AND gate 23E and internal H. sync signal HS1 are respectively supplied to the first and second input terminals of AND gate 23F.

Output Q3 from shift register 23C is supplied to the D input terminal of D-flip-flop 23I. Reset input terminal R of flip-flop 23I receives the output from AND gate 23E. Noninverted output Q of flip-flop 23I is converted to pulses HSB0 and HSB1 through EX-NOR gate 23J.

Internal V. sync signal VS1 from NAND gate 21H shown in FIG. 9 is supplied to the D input terminal of flip-flop 23K and EX-NOR gate 23L. D-flip-flop 23K is reset by the output from EX-NOR gate 23L, and is clocked in response to the leading edge of pulse CLK1 from NAND gate 25B shown in FIG. 9.

The noninverted output Q pulse from D-flip-flop 23K is supplied to second selection input terminal S2 of shift register 23M. First selection input terminal S1 of shift register 23M receives the output from AND gate 23P.

Outputs Q0 and Q2 from shift register 23M are respectively supplied to the first and second input terminals of AND gate 23N. The output from AND gate 23N and output Q3 from shift register 23M are respectively supplied to the first and second input terminals of AND gate 23O. The output from AND gate 23O and internal V. sync signal VS1 are respectively supplied to the first and second input terminals of AND gate 23P.

Output Q3 from shift register 23M is supplied to the D input terminal of D-flip-flop 23Q. Reset input terminal R of flip-flop 23Q receives the output from AND gate 23O. Noninverted output Q of flip-flop 23Q is converted to pulses VSB0 and VSB1 through EX-NOR gate 23R.

Figure 11:
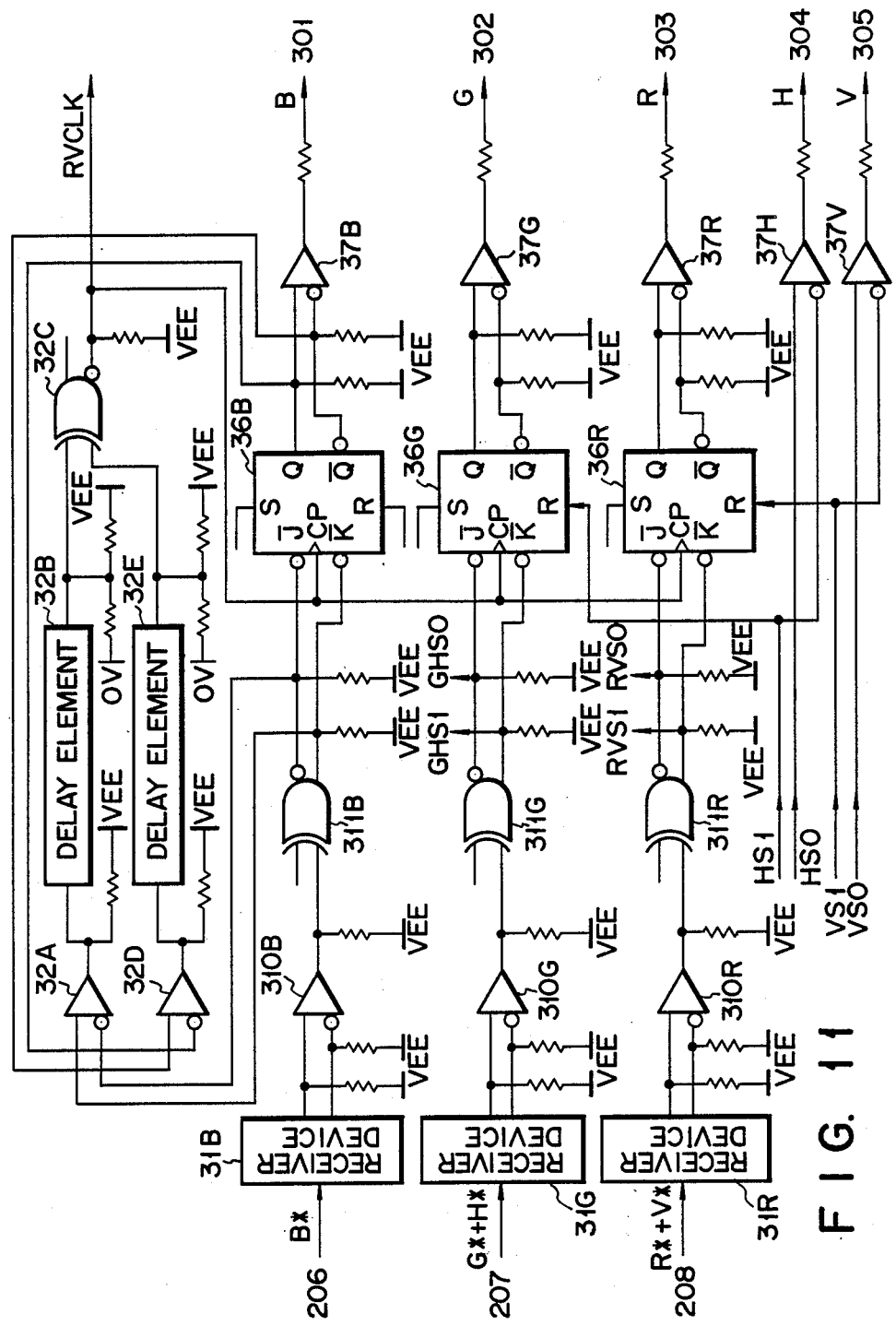
FIG. 11 is a circuit diagram of a receiver (31), a Manchester decoder (32), a synchronizer (36), and an output circuit (37) shown in FIG. 5.

FIG. 11 is a circuit diagram of the receiver (31), the Manchester decoder (32), the synchronizer (36), and the output circuit (37) shown in FIG. 5.

Video signals 206 to 208 sent from transmitter drivers 27B, 27G, and 27R shown in FIG. 9 are respectively input to receiver devices 31B, 31G, and 31R, respectively. (If video signals 206 to 208 are optically transmitted, each receiver device includes a photo/electric converter.)

Receiver devices 31B, 31G, and 31R respectively supply inphase and antiphase signal pairs corresponding to input signals (B*, G*+H*, and R*+V*) to differential input buffers 310B, 310G, and 310R. The outputs from buffers 310B, 310G, and 310R are respectively input to EX-NOR gates 311B, 311G, and 311R. The inverted outputs from EX-NOR gates 311B, 311G, and 311R are respectively supplied to the J input terminals of J-K flip-flops 36B, 36G, and 36R. The noninverted outputs from EX-NOR gates 311B, 311G, and 311R are respectively supplied to the $\overline{K}$ input terminals of J-K flip-flops 36B, 36G, and 36R.

The inverted output from EX-NOR gate 311B is supplied to the inverting input terminal of differential input buffer 32A, and the noninverted output from gate 311B is supplied to the noninverting input terminal of differential input buffer 32A. The signal edge of the output from buffer 32A is delayed by delay element 32B by a predetermined period of time, and is supplied to the first input terminal of EX-NOR gate 32C. The leading edge of inverted-output pulse RVCLK from EX-NOR gate 32C clocks J-K flip-flops 36B, 36G, and 36R.

Inverted and noninverted outputs $\overline{Q}$ and Q from J-K flip-flop 36B are respectively supplied to the noninverting and inverting input terminals of differential input buffer 32D. The signal edge of the output from buffer 32D is delayed by delay element 32E by a predetermined period of time, and is then supplied to the second input terminal of EX-NOR gate 32C. Inverted and noninverted outputs $\overline{Q}$ and Q from J-K flip-flop 36B are respectively supplied to the inverting and noninverting input terminals of differential input buffer 37B. The B output from buffer 37B serves as Manchester-decoded video signal 301.

J-K flip-flop 36G shown in FIG. 11 is reset by the leading edge of internal H. sync pulse HS1 as noninverted output Q from D-flip-flop 33D shown in FIG. 12. Inverted and noninverted outputs $\overline{Q}$ and Q from J-K flip-flop 36G are respectively supplied to the inverting and noninverting input terminals of differential input buffer 37G. The G output from buffer 37G serves as Manchester-decoded video signal 302.

J-K flip-flop 36R shown in FIG. 11 is reset by the leading edge of internal V. sync pulse VS1 as non inverted output Q from D-flip-flop 33H shown in FIG. 12. Inverted and noninverted outputs $\overline{Q}$ and Q from J-K flip-flop 36R are respectively supplied to the inverting and noninverting input terminals of differential input buffer 37R. The R output from buffer 37R serves as Manchester-decoded video signal 303.

Internal H. sync pulses HS1 and HS0 output from D-flip-flop 33D shown in FIG. 12 are respectively supplied to the inverting and noninverting input terminals of differential input buffer 37H shown in FIG. 11. Buffer 37H outputs sync signal 304 serving as H. sync pulse H.

Internal V. sync pulses VS1 and VS0 output from D-flip-flop 33H shown in FIG. 12 are respectively supplied to the inverting and noninverting input terminals of differential input buffer 37V shown in FIG. 11. Buffer 37V outputs sync signal 305 serving as V. sync pulse V.

FIG. 12 is a circuit diagram of the separator & reproducer (33) shown in FIG. 5. Pulses GHS0 and GHS1 output from EX-NOR gate 311G shown in FIG. 11 are respectively supplied to the inverting and noninverting input terminals of differential input buffer 33A shown in FIG. 12. Pulses RVS0 and RVS1 output from EX-NOR gate 311R shown in FIG. 11 are respectively supplied to the inverting and noninverting input terminals of differential input buffer 33E shown in FIG. 12.

Pulse RVCLK from EX-NOR gate 32C shown in FIG. 11 is supplied to delay element 33J shown in FIG. 12 and the first input terminal of EX-NOR gate 33I. The second input terminal of gate 33I receives the delayed output from delay element 33J.

The leading edge of the output signal from EX-NOR gate 33I clocks shift registers 33C and 33G, and counters 33K and 33L. (The functions of S1 and S2 terminals of shift registers 33C and 33G are the same as those of S1 and S2 terminals of shift registers 23C and 23M shown in FIG. 10.)

The output from buffer 33A is supplied to first selection input terminal S1 of shift register 33C through EX-NOR gate 33B. The leading edge of the Q3 output from shift register 33C sets D-flip-flop 33D and clocks counter 33M.

The output from buffer 33E is supplied to first selection input terminal S1 of shift register 33G through EX-NOR gate 33F. The leading edge of the Q3 output from shift register 33G sets D-flip-flop 33H.

The leading edge of the Q3 output from counter 33M resets D-flip-flop 33H. Pulse VS1 as the Q output from flip-flop 33H is supplied to second selection input terminal S2 of counter 33M.

Counters 33K, 33L, and 33M perform the following operations depending on the logical values at first and second input terminals S1 and S2. More specifically, if S1="0" and S2="0", the logical levels of data inputs D0 to D3 are preset. If S1="0" and S2="1", a count-up operation is performed. If S1="1" and S2="0", a down-count operation is performed. If S1="1" and S2="1", the count operation is stopped.

Pulse HS1 from D-flip-flop 33D is supplied to second selection input terminals S2 of counters 33K and 3L. The $\overline{CO}$ output from counter 33K is supplied to the $\overline{CI}$ input of counter 33L, and the Q3 output from counter 33L resets flip-flop 33D.

The sequence function table of counters 33K, 33L, and 33M is summarized below.

TABLE 1

| INPUT | | | | | | | | OUTPUT | | | | |
|---|---|---|---|---|---|---|---|---|---|---|---|---|
| S$_1$ | S$_2$ | D$_0$ | D$_1$ | D$_2$ | D$_3$ | $\overline{CI}$ | CP | Q$_0$ | Q$_1$ | Q$_2$ | Q$_3$ | $\overline{CO}$ |
| L | L | L | L | H | H | X | H | L | L | H | H | L |
| L | H | X | X | X | X | L | H | H | L | H | H | H |
| L | H | X | X | X | X | L | H | L | H | H | H | H |
| L | H | X | X | X | X | L | H | H | H | H | H | L |
| L | H | X | X | X | X | H | L | H | H | H | H | H |
| L | H | X | X | X | X | H | H | H | H | H | H | H |
| H | H | X | X | X | X | X | H | H | H | H | H | H |
| L | L | H | H | L | L | X | H | H | H | L | L | L |
| H | L | X | X | X | X | L | H | L | H | L | L | H |
| H | L | X | X | X | X | L | H | H | L | L | L | H |
| H | L | X | X | X | X | L | H | L | L | L | L | L |
| H | L | X | X | X | X | L | H | H | H | H | H | H |

In Table 1, L indicates logic "0", and H indicates logic "1", and X indicates logic "0" or "1".

Figure 13:
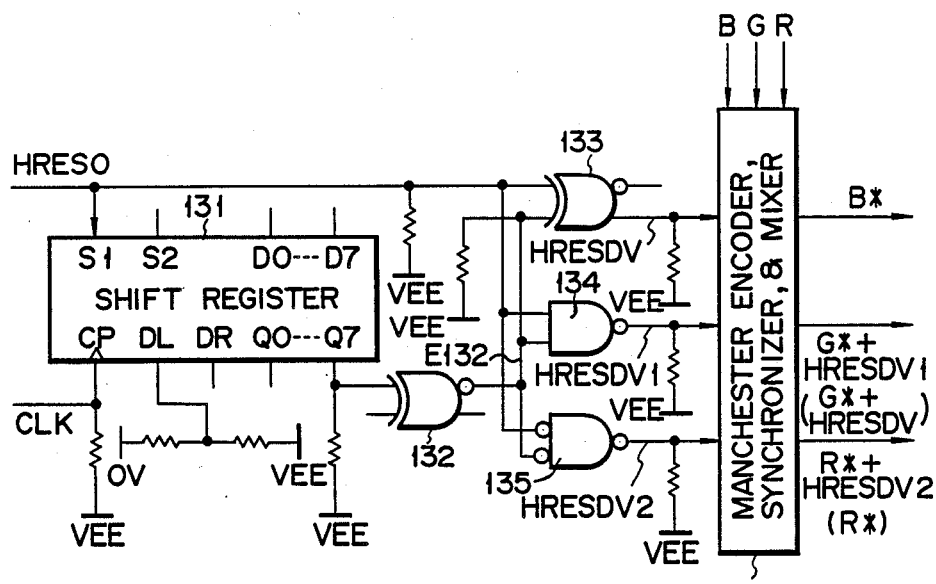
FIG. 13 shows a peripheral circuit of FIG. 4 for switching resolution of a CRT of the receiver part at the transmitter side.
Figure 14:
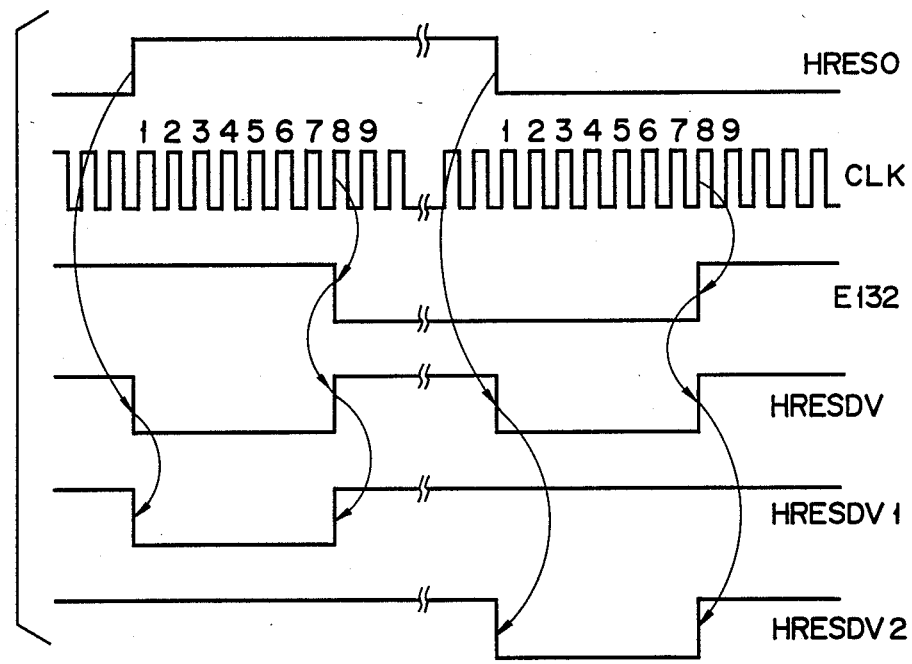
FIG. 14 is a timing chart for explaining the circuit operation shown in FIG. 13.

FIG. 13 shows a peripheral circuit of FIG. 4, which is used when resolution switching of the CRT at the receiver side is controlled at the transmitter side. FIG. 14 is a timing chart for explaining the circuit operation of FIG. 13.

Serial input terminal S1 of shift register 131 receives resolution switching signal HRESO shown in the first line of FIG. 14. Signal HRESO is set at logic "0" when the CRT performs a low-resolution display (e.g., 16×16 (dot) character font display). Signal HRESO is set at logic "1" when the CRT performs a high resolution display (e.g., 24×24 (dot) character font display). Signal HRESO is used for switching the horizontal scanning frequency of the CRT.

Shift register 131 is clocked by pulse CLK shown in the second line in FIG. 14, and outputs, from serial output terminal Q7, a resolution switching signal delayed by a time corresponding to 8 CLK pulses. The delayed resolution switching signal is converted to inverted delayed resolution switching signal E132 shown in the third line in FIG. 14 through EX-NOR gate 132 serving as an inverter.

Signal E132 is supplied to the first input terminals of EX-NOR gate 133, NOR gate 134, and OR gate 135. The second input terminals of these gates 133 to 135 receive resolution switching signal HRESO.

EX-NOR gate 133 outputs signal HRESDV shown in the fourth line in FIG. 14. Signal HRESDV serves as a signal indicating a resolution switching point on the CRT. NAND gate 134 outputs signal HRESDV1 shown in the fifth line in FIG. 14. Signal HRESDV1 serves as a signal indicating a leading point of signal HRESDV. OR gate 135 outputs signal HRESDV2 shown in the sixth line in FIG. 14. Signal HRESDV2 serves as a signal indicating a trailing point of signal HRESDV.

Signals HRESDV or HRESDV1 and HRESDV2 are mixed as burst signals with B, G, and R color signals by transmitter part 20 having the arrangement shown in FIG. 4.

Note that if only signal HRESDV is mixed with B, G, and R signal lines, the circuit configuration of mixer 26 shown in FIG. 4 can be simplified as compared to a case wherein signals HRESDV1 and HRESDV2 are mixed.

Figure 15:
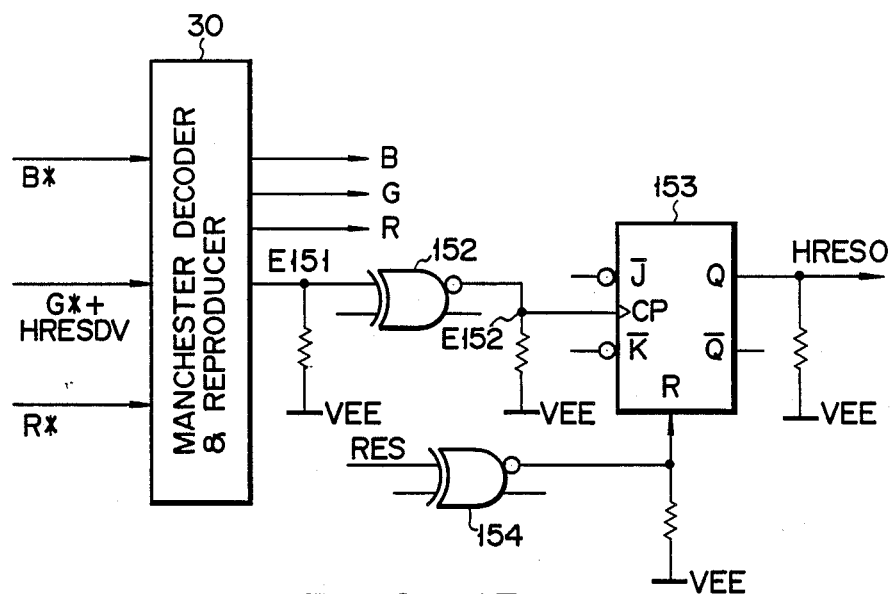
FIG. 15 is a circuit diagram showing an example of a peripheral circuit of FIG. 5 used for the circuit shown in FIG. 13.
Figure 16:
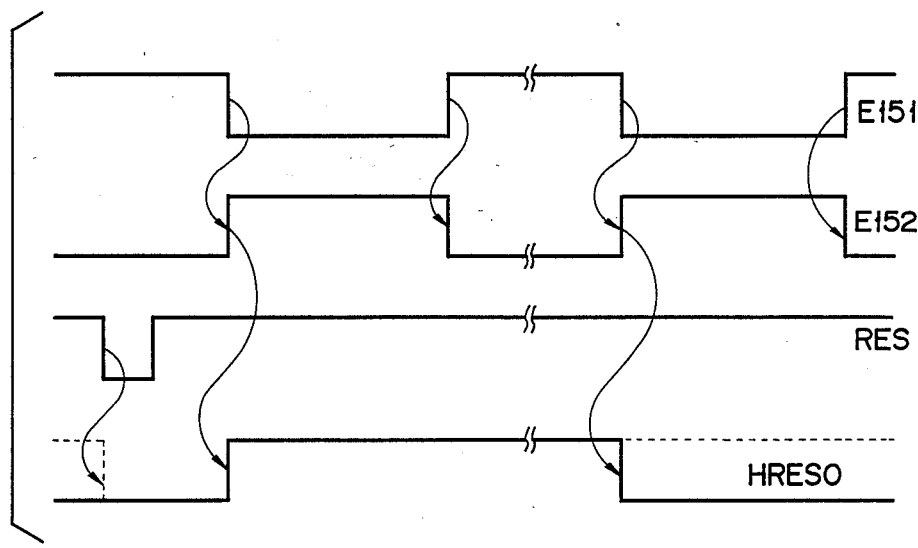
FIG. 16 is a timing chart for explaining the circuit operation of FIG. 15.

FIG. 15 shows a peripheral circuit of FIG. 5 used together with the circuit shown in FIG. 13. FIG. 16 is a timing chart for explaining the circuit operation of FIG. 15.

Modulated video signals B*, G*+HRESDV, and R* sent from transmitter part 20 shown in FIG. 13 are input to receiver part 30 shown in FIG. 15 which has the arrangement as shown in FIG. 5. Receiver part 30 decodes color signals B, G, and R from Manchester-encoded input signals B*, G*+HRESDV, and R*, and separates signal HRESDV in the same manner as in the separation method of signal H in FIG. 5. Signal HRESDV is output as signal E151 (in the first line in FIG. 16).

Signal E151 is converted to clock pulse E152 (in the second line in FIG. 16) through EX-NOR gate 152, and is supplied to clock input CP of J-K flip-flop 153 serving as a T-flip-flop.

Flip-flop 153 is reset by a pulse obtained by inverting initialization pulse RES (e.g., power-on-reset pulse) (in the third line in FIG. 16) by EX-NOR gate 154. More specifically, flip-flop 153 is reset in response to the trailing edge of initialization pulse RES (on the left sides of the third and fourth lines in FIG. 16). After flip-flop 153 is reset in response to the trailing edge of pulse RES, it is clocked by the leading edge of each pulse E152 and outputs resolution switching signal HRESO (in the fourth line in FIG. 16) corresponding to the signal in the first line in FIG. 14.

Figure 17:
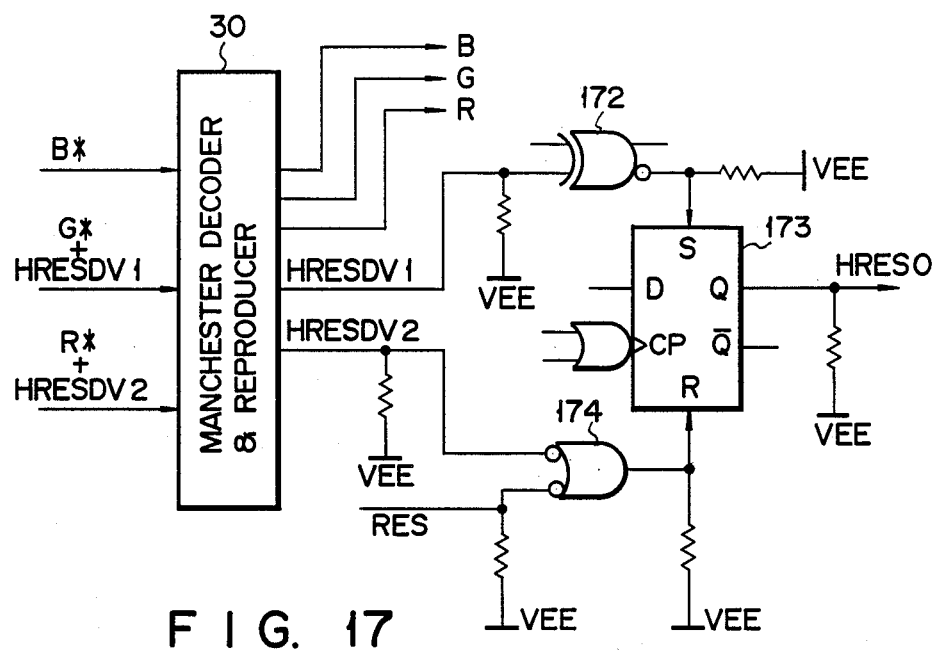
FIG. 17 is a circuit diagram showing another example of a peripheral circuit of FIG. 5 used for the circuit shown in FIG. 13.
Figure 18:
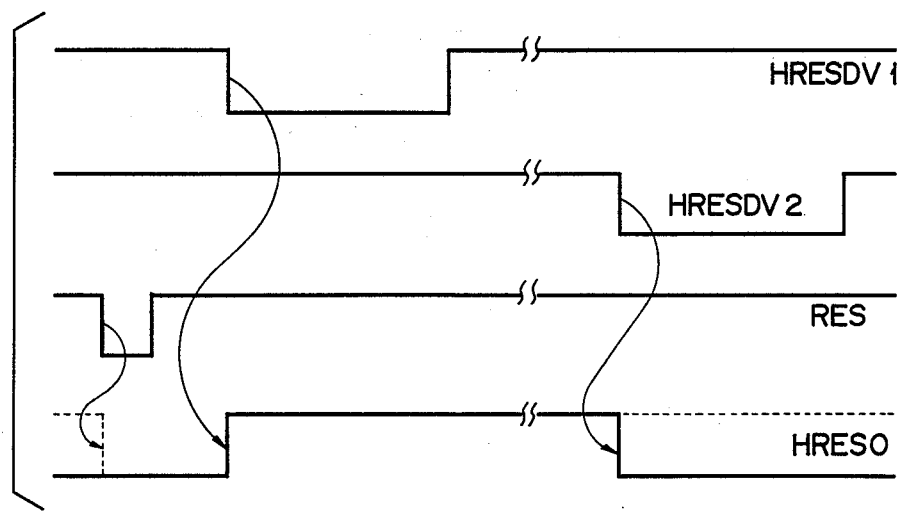
FIG. 18 is a timing chart for explaining the circuit operation of FIG. 17.

FIG. 17 shows another peripheral circuit of FIG. 5, which is used together with the circuit shown in FIG. 13. FIG. 18 is a timing chart for explaining the circuit operation of FIG. 17.

Modulated video signals B*, G*+HRESDV1, and R*+HRESDV2 sent from transmitter part 20 shown in FIG. 13 are input to receiver part 30 in FIG. 17, which has the arrangement shown in FIG. 5. Receiver part 30 decodes NRZ color signals B, G, and R from Manchester-encoded input signals B*, G*+HRESDV1, and R*+HRESDV2, and separates signals HRESDV1 (in the first line in FIG. 18) and signal HRESDV2 (in the second line in FIG. 18) in the same manner as in a separation method of signals H and V in FIG. 5.

Signal HRESDV1 is converted to a set pulse through EX-NOR gate 172, and is then supplied to set input S of D-flip-flop 173. Signal HRESDV2 is converted to a reset pulse through the first input of NAND gate 174, and is then supplied to reset input R of D-flip-flop 173.

The second input terminal of NAND gate 174 receives initialization pulse RES (e.g., power-on-reset pulse) (in the third line in FIG. 18). Flip-flip 173 is reset in response to signal HRESDV2 upon completion of initialization (RES=1). Flip-flop 173 is set in response to the trailing edge of pulse HRESDV1, and thereafter is reset in response to the trailing edge of pulse HRESDV2. Flip-flop 173 then outputs resolution switching signal HRESO (in the fourth line in FIG. 18) corresponding to the signal in the first line in FIG. 14.

In FIG. 17, flip-flop 173 can be set/reset by separated signals (HRESDV1 and HRESDV2). For this reason, even if the apparatus body of the receiver side is software-reset, the resolution switching selection relationship between the apparatus body and the CRT display is not disturbed.

Figure 21:
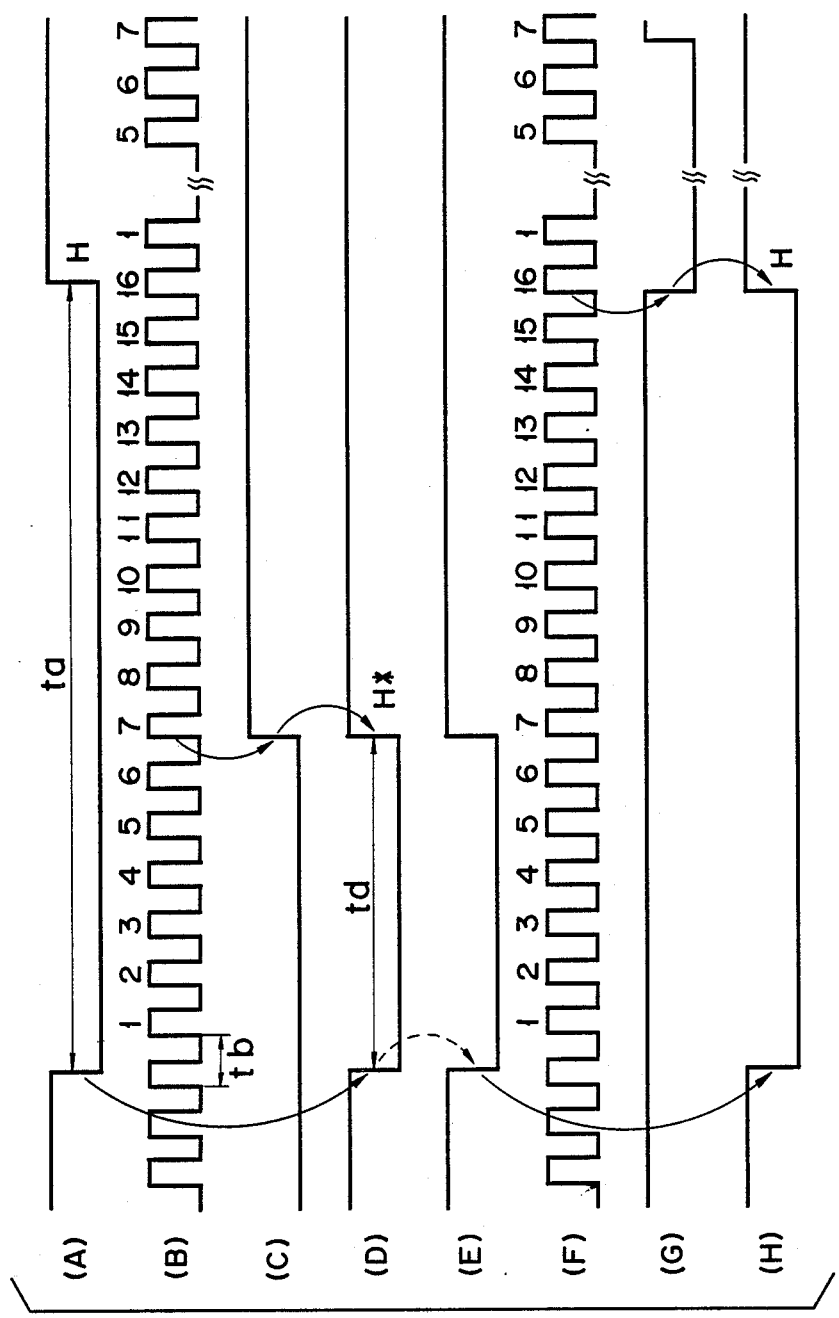
FIG. 21 is a timing chart for explaining the circuit operations of the sync signal modifying circuit shown in FIG. 19 and the sync signal reproducing circuit shown in FIG. 20.

FIG. 19 shows a sync signal modifying circuit for generating modified sync signal 53 from sync signal 51 shown in FIG. 8 in transmitter part 20. FIG. 20 shows a sync signal reproducing circuit for reproducing sync signal 54 having a normal pulse width from modified sync signal 53 shown in FIG. 8 in receiver part 30. FIG. 21 is a timing chart for explaining the circuit operations of the sync signal modifying circuit shown in FIG. 19 and the sync signal reproducing circuit shown in FIG. 20.

Serial input terminal S1 of shift register 191 receives H. sync signal H shown in FIG. 21(A). Pulse width ta of signal H is predetermined, and corresponds to, e.g., 16 dot clocks DCK (FIG. 21(B)) input to shift register 191.

Shift register 191 is clocked by clocks DCK, and outputs from serial output terminal Q6 a signal delayed by a time corresponding to 7 DCK pulses. The delayed signal is converted to an inverted delayed signal shown in FIG. 21(C) through EX-NOR gate 192 serving as an inverter.

The inverted delayed signal is supplied to the first input terminal of OR gate 193. The second input terminal of gate 193 receives H. sync signal H. Gate 193 outputs modified sync signal H* having pulse width td corresponding to modified sync signal 53 shown in FIG. 8.

Modified sync signal H* is mixed and modulated by transmitter part 20 shown in FIG. 4, and is transmitted to receiver part 30 shown in FIG. 5. Modified sync signal H* is separated from modulated color signal G*+H* by receiver part 30. Separated modified sync signal H* (FIG. 21(E)) is input to serial input terminal S1 of shift register 201. Pulse width td of sync signal H* corresponds to 7 dot clocks DCK (FIG. 21(F)) input to shift register 201.

Shift register 201 is clocked by clocks DCK, and outputs from serial output terminal Q15 a signal (FIG. 21(G)) delayed by a time corresponding to 16 DCK pulses. The delayed signal is converted to a set pulse through EX-NOR gate 202 serving as an inverter, and the set pulse is supplied to set input S of D-flip-flop 204.

Modified sync signal H* is also converted to a reset pulse through EX-NOR gate 203 serving as an inverter, and the reset pulse is supplied to reset input R of D-flip-flop 204.

After flip-flop 204 is reset in response to the trailing edge of signal H* (E), it is set in response to the trailing edge of the Q15 output signal (G) from shift register 201, and outputs H. sync signal H (FIG. 21(H)) corresponding to signal H in FIG. 21(A).

Reference numerals of circuit elements shown in FIGS. 9 to 20 generally correspond to elements in FIGS. 3 to 5 having similar reference numerals. However, a correspondence between FIGS. 9 to 20 and FIGS. 3 to 5 should not be limited by the similarity between reference numerals of FIGS. 9 to 20 and those of FIGS. 3 to 5. It should be noted that some circuit elements of FIGS. 9 to 20 have functions corresponding to a plurality of blocks of FIGS. 3 to 5.

With the video signal transmission system of the embodiment described above, after the NRZ video signals are converted to Manchester-encoded signals, sync signals are mixed therewith as burst signals. Then, the mixed signals are transmitted to the CRT display. Thus, the video signals and the sync signals can be sent using a decreased number of signal lines. Since various signals are Manchester-encoded, video signals can be reliably transmitted even in a transmission system having a characteristic that allows only an AC component to pass therethrough. Therefore, an optical transmission module having a pass band falling within the range of 0.2 MHz to 64 MHz can be effectively used. If an optical module is used, data transmission having a high electromagnetic noise resistance can be performed in long-distance video signal transmission.

If the CRT display connected to receiver part 30 shown in FIG. 3 comprises a monochrome monitor, for example, an H (or V) sync signal is used as signal 206, and Manchester-encoded Y+V (or H) sync signal can be used as signal 207. In this manner, signal lines from transmitter part 20 to receiver part 30 can be reduced from three (Y, H, V) to two (Y+H, V).

The present invention is not limited to the above embodiment. For example, as shown in FIG. 8, if a trailing edge of original sync signal 51 overlaps period T5 as a part of a generation period of video signal 52, the trailing edge of sync signal 51 is shortened over period T6 to obtain sync signal 53 having a pulse width as short as possible. In the receiver part, sync signal 53 may be reproduced to be sync signal 54 having an original pulse width. This method is effective for a case when a transmission system (e.g., an optical transmission system) requiring a mark/space ratio of ½ is used. Since the burst signals can be detected if a signal is kept at the same level for a period corresponding to 2 data bits, the pulse width of the sync signal need only correspond to a minimum of 2-bit data portion.

In the above embodiment, paying attention to the fact that the central bit data is always inverted in Manchester-encoded signal 43, a special function (e.g., a function of resolution switching signal HRESO in FIG. 13) may be provided to a burst signal (CRV signal) not complying with the above encoding rule, and the burst signal may be used.

The burst signal is illustrated as a low-level signal but may be a high-level signal. In the above embodiment, Manchester encoding is employed. However, the present invention is not limited to this. Any modulation scheme capable of mixing and separating signals (e.g., a scheme wherein data is always inverted from "0" to "1" or "1" to "0" at the center of the bit string) may be employed. For example, a Differential Manchester format can be used. The host station and transmitter part 20 are separately arranged. However, transmitter part 20 may be incorporated in the host station. Similarly, the CRT display may be incorporated in receiver part 30. Various other changes and modifications may be made within the scope of the claims of this invention.

According to the present invention as described above, a video signal transmission system can be provided wherein video signals and the like can be reliably transmitted over a long distance without being influenced by an inter-line capacitance of cables, and the number of signal lines can be decreased to reduce cost.

What is claimed is:

1. A signal transmission system for transmitting main signals and sub signals from a transmitter part to a receiver part through signal transmission lines, wherein said transmitter part comprises:
    modulation means for modulating the main signals by a predetermined modulation method which allows separation of the main signals from the sub signals, and outputting modulated main signals;
    mix means, coupled to said modulation means, for mixing the sub signals with the modulated main signals, and outputting three transmission signals each of said transmission signals having any one of three separate modulated main signals, two of said three transmission signals having a separate sub signal, which is a sync signal, mixed with the modulated main signal; and
    transmission means, coupled to said mix means, for transmitting the transmission signals onto said signal transmission lines.

2. A system according to claim 1, wherein said receiver part comprises:
    demodulation means for demodulating, by a predetermined demodulation method, signal components of the modulated main signals from the transmission signals which are sent from said transmission means through said signal transmission lines, and separating demodulated main signals, corresponding to the modulated main signals, from the transmission signals.

3. A system according to claim 1, wherein the main signals include video signals, and the sub signals include sync signals for the video signals.

4. A system according to claim 3, wherein said transmitter part further comprises:
    sync signal processing means for performing Code Rule Violation processing of the sync signals to generate burst signal-like sync signals, and supplying the burst signal-like sync signals to said mix means.

5. A system according to claim 1, wherein the predetermined modulation method is a modulation method based on a Manchester format.

6. A system according to claim 5, wherein the modulated main signals include Non Return to Zero video data.

7. A system according to claim 2, wherein the main signals include video signals, and the sub signals include sync signals for the video signals.

8. A system according to claim 7, wherein said transmitter part further comprises:
    sync signal processing means for performing Code Rule Violation processing of the sync signals to generate burst signal-like sync signals, and supplying the burst signal-like sync signals to said mix means.

9. A system according to claim 8, wherein the predetermined modulation method is a modulation method based on a Manchester format.

10. A system according to claim 9, wherein the modulated main signals include Non Return to Zero video data.

11. A system according to claim 8, wherein said receiver part further comprises:
    reception part sync signal processing means for separating the burst-like sync signals from the transmission signals sent from said transmission means through said signal transmission lines.

12. A system according to claim 2, wherein said transmitter part further comprises:
    means for mixing as the sub signal a resolution switching signal for switching a display resolution of a display device for displaying the main signals with the modulated main signals.

13. A system according to claim 12, wherein said receiver part further comprises:
    means for separating the resolution switching signal from the transmission signals.

14. A system according to claim 12, wherein said receiver part further comprises:
    means for separating a first resolution switching signal indicating a leading edge of the resolution switching signal and a second resolution switching signal indicating a trailing edge of the resolution switching signal from the transmission signals, and generating the resolution switching signal from the separated first and second resolution switching signals.

15. A system according to claim 2, wherein said transmitter part further comprises:
means for shortening a signal width of the sub signal to be smaller than a predetermined rated signal width to generate a modified sub signal, and mixing as the sub signal the modified sub signal with the modulated main signal.

16. A system according to claim 15, wherein said receiver part further comprises:
means for separating the modified sub signal from the transmission signals, and converting the separated modified sub signal into the sub signal having the rated signal width.

17. A video signal transmission system for transmitting a plurality of video signals and horizontal/vertical sync signals from a transmitter part to a receiver part through a plurality of signal transmission lines, wherein said transmitter part comprises:
modulating means for modulating the video signals by a modulation method based on a Manchester format, and generating a plurality of modulated video signals including Non Return to Zero video data;
synchronizing means for performing Code Rule Violation processing of the horizontal/vertical sync signals, and generating burst signal-like sync signals in synchronism with the modulated video signals;
mix means, coupled to said modulating means and said synchronizing means, for mixing the burst signal-like sync signals with part of the modulated video signals, and generating a plurality of transmission signals numbering less than a sum of the numbers of the modulated video signals and the horizontal/vertical sync signals; and
transmission means, coupled to said mix means, for transmitting the transmission signals to said signal transmission lines.

18. A system according to claim 17, wherein said receiver part comprises:
reception means for separating and extracting the modulated video signals and video signal components including the burst signal-like sync signals from the transmission signals which are sent from said transmission means through said signal transmission lines;
demodulating means, coupled to said reception means, for demodulating signal components of the video signals from the separated and extracted modulated video signals by a demodulation method based on the Manchester format, and separating demodulated video signals, corresponding in number to the modulated video signals, from the burst signal-like sync signals; and
sync separating means, coupled to said reception means, for separating the horizontal/vertical sync signals from the separated and extracted video signal components.

19. A system according to claim 18, wherein said receiver part further comprises:
synchronizing means, coupled to said demodulating means and said sync separating means, for synchronizing the demodulated video signals with the separated horizontal/vertical sync signals.

20. A signal transmission system for transmitting main signals and sub signals from a transmitter part to a receiver part through signal transmission lines, wherein said transmitter part comprises:
modulation means for modulating the main signals, which include video signals, by a predetermined modulation method which allows separation of the main signals from the sub signals, which include sync signals for the video signals, and outputting modulated main signals;
mix means, coupled to said modulation means, for mixing the sub signals with the modulated main signals, and outputting a plurality of transmission signals numbering less than a sum of the numbers of the modulated main signals and the sub signals;
sync signal processing means for performing Code Rule Violation processing of the sync signals to generate burst signal-like sync signals, and supplying the burst signal-like sync signals to said mix means; and
transmission means, coupled to said mix means, for transmitting the transmission signals onto said signal transmission lines.

21. A system according to claim 20, wherein said receiver part comprises:
demodulation means for demodulating, by a predetermined demodulation method, signal components of the modulated main signals from the transmission signals which are sent from said transmission means through said signal transmission lines, and separating demodulated main signals, corresponding to the modulated main signals, from the transmission signals.

22. A system according to claim 21, wherein the predetermined modulation method is a modulation method based on a Manchester format.

23. A system according to claim 22, wherein the modulated main signals include Non Return to Zero video data.

24. A system according to claim 21, wherein said receiver part further comprises:
reception part sync signal processing means for separating the burst-like sync signals from the transmission signals sent from said transmission means through said signal transmission lines.

25. A system according to claim 21, wherein said transmitter part further comprises:
means for mixing as the sub signal a resolution switching signal for switching a display resolution of a display device for displaying the main signals with the modulated main signals.

26. A system according to claim 25, wherein said receiver part further comprises:
means for separating the resolution switching signal from the transmission signals.

27. A system according to claim 25, wherein said receiver part further comprises:
means for separating a first resolution switching signal indicating a leading edge of the resolution switching signal and a second resolution switching signal indicating a trailing edge of the resolution switching signal from the transmission signals, and generating the resolution switching signal from the separated first and second resolution switching signals.

28. A system according to claim 21, wherein said transmitter part further comprises:

means for shortening a signal width of the sub signal to be smaller than a predetermined rated signal width to generate a modified sub signal, and mixing as the sub signal the modified sub signal with the modulated main signal.

29. A system according to claim 28, wherein said receiver part further comprises:
means for separating the modified sub signal from the transmission signals, and converting the separated modified sub signal into the sub signal having the rated signal width.

30. A system according to claim 20, wherein the predetermined modulation method is a modulation method based on a Manchester format.

31. A system according to claim 30, wherein the modulated main signals include Non Return to Zero video data.

32. A signal transmission system for transmitting main signals and sub signals from a transmitter part to a receiver part through signal transmission lines, wherein said transmitter part comprises:
modulation means for modulating the main signals by a predetermined modulation method which allows separation of the main signals from the sub signals, and outputting modulated main signals;
mix means, coupled to said modulation means, for mixing the sub signals with the modulated main signals, and outputting a plurality of transmission signals numbering less than a sum of the numbers of the modulated main signals and the sub signals;
means for mixing as the sub signal a resolution switching signal for switching a display resolution of a display device for displaying the main signals with the modulated main signals; and
transmission means, coupled to said mix means, for transmitting the transmission signals onto said signal transmission lines;
and wherein said receiver part comprises:
demodulation means for demodulating, by a predetermined demodulation method, signal components of the modulated main signals from the transmission signals which are sent from said transmission means through said signal transmission lines, and separating demodulated main signals, corresponding to the modulated main signals, from the transmission signals.

33. A system according to claim 32, wherein the main signals include video signals, and the sub signals include sync signals for the video signals.

34. A system according to claim 33, wherein said transmitter part further comprises:
sync signal processing means for performing Code Rule Violation processing of the sync signals to generate burst signal-like sync signals, and supplying the burst signal-like sync signals to said mix means.

35. A system according to claim 34, wherein the predetermined modulation method is a modulation method based on a Manchester format.

36. A system according to claim 35, wherein the modulated main signals include Non Return to Zero video data.

37. A system according to claim 34, wherein said receiver part further comprises:
reception part sync signal processing means for separating the burst-like sync signals from the transmission signals sent from said transmission means through said signal transmission lines.

38. A system according to claim 32, wherein said receiver part further comprises:
means for separating the resolution switching signal from the transmission signals.

39. A system according to claim 32, wherein said receiver part further comprises:
means for separating a first resolution switching signal indicating a leading edge of the resolution switching signal and a second resolution switching signal indicating a trailing edge of the resolution switching signal from the transmission signals, and generating the resolution switching signal from the separated first and second resolution switching signals.

40. A system according to claim 32, wherein the predetermined modulation method is a modulation method based on a Manchester format.

41. A system according to claim 40, wherein the modulated main signals include Non Return to Zero video data.

42. A system according to claim 32, wherein said transmitter part further comprises:
means for shortening a signal width of the sub signal to be smaller than a predetermined rated signal width to generate a modified sub signal, and mixing as the sub signal the modified sub signal with the modulated main signal.

43. A system according to claim 42, wherein said receiver part further comprises:
means for separating the modified sub signal from the transmission signals, and converting the separated modified sub signal into the sub signal having the rated signal width.

44. A signal transmission system for transmitting main signals and sub signals from a transmitter part to a receiver part through signal transmission lines, wherein said transmitter part comprises:
modulation means for modulating the main signals, by a predetermined modulation method which allows separation of the main signals from the sub signals, and outputting modulated main signals;
mix means, coupled to said modulation means, for mixing the sub signals with the modulated main signals, and outputting a plurality of transmission signals numbering less than a sum of the numbers of the modulated main signals and the sub signals;
means for shortening a signal width of the sub signal to be smaller than a predetermined rated signal width to generate a modified sub signal, and mixing as the sub signal the modified sub signal with the modulated main signal; and
transmission means, coupled to said mix means, for transmitting the transmission signals onto said signal transmission lines;
and wherein said receiver part comprises:
demodulation means for demodulating, by a predetermined demodulation method, signal components of the modulated main signals from the transmission signals which are sent from said transmission means through said signal transmission lines, and separating demodulated main signals, corresponding to the modulated main signals, from the transmission signals.

45. A system according to claim 44, wherein the main signals include video signals, and the sub signals include sync signals for the video signals.

46. A system according to claim 45, wherein said transmitter part further comprises:

sync signal processing means for performing Code Rule Violation processing of the sync signals to generate burst signal-like sync signals, and supplying the burst signal-like sync signals to said mix means.

47. A system according to claim 46, wherein the predetermined modulation method is a modulation method based on a Manchester format.

48. A system according to claim 47, wherein the modulated main signals include Non Return to Zero video data.

49. A system according to claim 46, wherein said receiver part further comprises:
reception part sync signal processing means for separating the burst-like sync signals from the transmission signals sent from said transmission means through said signal transmission lines.

50. A system according to claim 44, wherein said transmitter part further comprises:
means for mixing as the sub signal a resolution switching signal for switching a display resolution of a display device for displaying the main signals with the modulated main signals.

51. A system according to claim 50, wherein said receiver part further comprises:
means for separating the resolution switching signal from the transmission signals.

52. A system according to claim 50, wherein said receiver part further comprises:
means for separating a first resolution switching signal indicating a leading edge of the resolution switching signal and a second resolution switching signal indicating a trailing edge of the resolution switching signal from the transmission signals, and generating the resolution switching signal from the separated first and second resolution switching signals.

53. A system according to claim 44, wherein said receiver part further comprises:
means for separating the modified sub signal from the transmission signals, and converting the separated modified sub signal into the sub signal having the rated signal width.

54. A system according to claim 44, wherein the predetermined modulation method is a modulation method based on a Manchester format.

55. A system according to claim 54, wherein the modulated main signals include Non Return to Zero video data.

56. A signal transmission system for transmitting main signals and sub signals from a transmitter part to a receiver part through signal transmission lines, wherein said transmitter part comprises:
modulation means for modulating the main signals, which include video signals, by a predetermined modulation method which allows separation of the main signals from the sub signals, which include sync signals for the video signals, and outputting modulated main signals;
mix means coupled to said modulation means, for mixing the sub signals with the modulated main signals, and outputting a plurality of transmission signals numbering less than a sum of the numbers of the modulated main signals and the sub signals;
sync signal processing means for performing Code Rule Violation processing of the sync signals to generate burst signal-like sync signals, and supplying the burst signal-like sync signals to said mix means; and
transmission means, coupled to said mix means, for transmitting the transmission signals onto said signal transmission lines;
and wherein said receiver part comprises:
demodulation means for demodulating, by a predetermined demodulation method, signal components of the modulated main signals from the transmission signals which are sent from said transmission means through said signal transmission lines, and separating demodulated main signals, corresponding to the modulated main signals, from the transmission signals.

57. A system according to claim 23, wherein said receiver part further comprises:
reception part sync signal processing means for separating the burst-like sync signals from the transmission signals sent from said transmission means through said signal transmission lines.

58. A system according to claim 23, wherein said transmitter part further comprises:
means for mixing as the sub signal a resolution switching signal for switching a display resolution of a display device for displaying the main signals with the modulated main signals.

59. A system according to claim 58, wherein said receiver part further comprises:
means for separating the resolution switching signal from the transmission signals.

60. A system according to claim 58, wherein said receiver part further comprises:
means for separating a first resolution switching signal indicating a leading edge of the resolution switching signal and a second resolution switching signal indicating a trailing edge of the resolution switching signal from the transmission signals, and generating the resolution switching signal from the separated first and second resolution switching signals.

61. A system according to claim 23, wherein said transmitter part further comprises:
means for shortening a signal width of the sub signal to be smaller than a predetermined rated signal width to generate a modified sub signal, and mixing as the sub signal the modified sub signal with the modulated main signal.

62. A system according to claim 15, wherein said receiver part further comprises:
means for separating the modified sub signal from the transmission signals, and converting the separated modified sub signal into the sub signal having the rated signal width.

* * * * *